March 28, 1967     S. SIJTSTRA ET AL     3,310,954
ARRANGEMENT FOR CONVERTING MECHANICAL ENERGY
INTO CALORIC ENERGY OR CONVERSELY
Filed Sept. 2, 1965     4 Sheets-Sheet 1

INVENTORS
SYTSE SIJTSTRA
JAN D. MELIO
BY

*Frank R. Trifari*

AGENT

March 28, 1967  S. SIJTSTRA ETAL  3,310,954
ARRANGEMENT FOR CONVERTING MECHANICAL ENERGY
INTO CALORIC ENERGY OR CONVERSELY
Filed Sept. 2, 1965  4 Sheets-Sheet 4

INVENTORS
SYTSE SIJTSTRA
JAN D. MELIO
BY

Frank R. Trifari

AGENT 3,310,954
ARRANGEMENT FOR CONVERTING MECHANICAL ENERGY INTO CALORIC ENERGY OR CONVERSELY
Sytse Sijtstra, Drachten, and Jan Dirk Melio, Emmasingel, Eindhoven, Netherlands, assignors to North American Philips Company, Inc., New York, N.Y., a corporation of Delaware
Filed Sept. 2, 1965, Ser. No. 484,643
Claims priority, application Netherlands, Sept. 11, 1964, 64/10576
10 Claims. (Cl. 62—6)

This invention relates to arrangements for converting mechanical energy into caloric energy or conversely, comprising at least one space having a variable volume, which has a comparatively high mean temperature during operation of the arrangement, and connected to at least one space likewise of variable volume, which has comparatively low mean temperatures during operation of the arrangement. The connection between the said spaces includes at least one heat-changer through which a working medium can flow back and forth on its way from one space to the other to give off heat during flow in one direction and to absorb heat during flow in the other direction.

In known arrangements of the said kind to which the present invention relates, the relevant heat-exchanger is constituted by a regenerator. Satisfactory operation of the regenerator is very important for the efficiency of such arrangements. To obtain satisfactory regenerating action the filling mass must consist of a material having a high specific heat. Under certain conditions, for example, at very low temperatures, the ordinary filling material of the regenerator exhibits a considerable decrease in specific heat.

An object of the invention is to obviate this disadvantage and, to this end, the invention is characterized in that the heat-exchanger is formed as a recuperator and comprises at least two sets of ducts through the first set of which the said working medium can flow back and forth and through the second set of which another medium can flow back and forth, the arrangement including means for reversing the direction of flow of the last-mentioned medium at least substantially at the same time with the reversal of the direction of flow of the said working medium. According to the invention the recuperator is preferably formed as a counterflow recuperator since heat-exchange with counterflow takes place with higher efficiency. However, under certain conditions, it is possible to use a cross flow recuperator on structural grounds.

The medium in the second set of recuperator ducts serves as a regenerating filling mass. The working medium gives off heat to this medium during one period and absorbs therefrom substantially the same amount of heat during the subsequent period. This recuperator, which acts as a regenerator, affords the advantage that one is no longer confined to using ordinary solids as the mass absorbing and giving off heat. The medium used may be a liquid or a gas. The use of a gaseous medium affords the important advantage that it still has a fairly high specific heat even at very low temperatures so that sufficient heat can be stored even under these conditions.

One advantageous embodiment of the arrangement according to the invention is characterized in that the second set of ducts of the recuperator communicates at one of their ends with one end of the cylinder and at their other ends with the other end of the said cylinder, the cylinder containing a piston-like body which can move so that the flow of medium in the second set of ducts reverses its direction substantially simultaneously with the flow of the working medium in the first set of ducts.

In this embodiment the medium in the second set of ducts is moved back and forth therein by means of a displacer moved in the correct phase. The medium then serves only as a heat-carrier.

In arrangements of the kind to which the present invention relates and in which a plurality of cycles are performed, it is possible in accordance with the invention to bring the working medium of one cycle in a recuperator into heat-exchange with the working medium of another cycle. The working medium of one cycle thus periodically serves as a heat accumulator for the heat from the working medium of the other cycle.

One embodiment of the arrangement according to the invention which is designed as a hot-gas piston engine comprises at least two separate cylinders in which piston-like bodies are movable which can vary the volumes of at least one compression space and at least one expansion space, these spaces exhibiting relatively different mean temperatures during operation of the arrangement. This arrangement is charatecterized in that a recuperator is provided between at least one pair of spaces of one cylinder and a corresponding pair of spaces of the other cylinder, the first set of ducts of this recuperator forming part of the communication between the relevant pair of spaces of one cylinder and the second set of ducts forming part of the communication between the corresponding pair of spaces of the other cylinder, a phase difference of approximately 180° existing between the movements of the piston-shaped bodies of the first cylinder and the movements of the corresponding piston-shaped bodies of the second cylinder.

Another embodiment of the arrangement according to the invention which comprises three separate cylinders in which cycles of a hot-gas piston engine are performed likewise includes a recuperator between corresponding spaces. In this embodiment the corresponding piston-shaped bodies exhibit a phase displacement of 120°.

In the two afore-mentioned embodiments the working medium of one cycle is in heat-exchange with that of another cycle. Alternately, the working medium of a cycle flowing to a warmer space is heated up, thus absorbing heat from the working medium of another cycle which just flows to a colder space, and is cooled when flowing to a colder space, thus giving off its heat to the medium of another cycle which flows to a warmer space. A recuperator acting similarly to a regenerator is thus obtained with simple means. This recuperator affords the additional advantage that it still operates satisfactorily even at very low temperatures.

In view of the last-mentioned advantage, a recuperator according to the invention may be used with great advantage in a hot-gas piston engine operating on the reverse hot-gas motor principle, which comprises a plurality of expansion spaces. According to the invention a recuperator is provided at least between the expansion spaces. If desired, a recuperator may also be provided between the expansion space of higher mean temperature and the compression space. It is also possible to use a regenerator between the last-mentioned spaces.

Another embodiment of the arrangement according to the invention comprises at least one compression space and two cylinders with piston-shaped bodies movable therein, the piston-shaped body in each cylinder permitting the volume of a space having a comparatively high temperature and the volume of a space having a comparatively low mean temperature to be varied in phase opposition, it being possible to communicate the compression space through controlled valves to each space of a comparatively high mean temperature, and a control device being provided for operating the controlled valves with each cylinder so that the inlet valve is opened when the space of comparatively high mean temperature has substantially its maximum volume and is closed after the piston-shaped body has begun to move towards the space of the comparatively high mean temperature, whereafter the control device slowly opens the outlet valve when the space of comparatively low mean temperature has substantially its maximum volume and keeps the outlet valve open until the said space has substantially its minimum volume.

This arrangement is characterized in that the communication between the space of the comparatively high mean temperature and the space of the comparatively low mean temperature of each cylinder includes a recuperator comprising at least two sets of ducts the first set of which forms part of the communication between the relevant spaces in the first cylinder and the second set of which forms part of the communication between the corresponding spaces of the second cylinder, the two piston-shaped bodies being movable substantially in phase opposition.

In another advantageous embodiment of the arrangement above described, a cooler is provided in that portion of the communication between the two spaces separated by the piston-shaped body which is located between the recuperator and the space of the comparatively high temperature. In this cooler the medium flowing from the space of comparatively high temperature to the space of comparatively low temperature, gives off heat to the cooling medium.

The operation and the advantages of this arrangement will be described in detail with reference to the figures.

In another embodiment of the arrangement above referred to, which is especially suitable for producing cold at very low temperatures, the cooler is formed by the cold-gas refrigerator.

In another advantageous embodiment of the arrangement according to the invention the recuperator is designed so that the ducts through which the working medium flows are separated by a small space which is filled with a material having a high specific heat. If the flows of media do not reverse exactly simultaneously the material present between the ducts may thus temporarily serve for the storage of heat.

In another embodiment the material present between the duct is selected from the group consisting of mercury, lead, cadmium and/or their alloys. This arrangement is especially suitable for producing cold at low temperatures.

In order that the invention may be readily carried into effect, several embodiments thereof will now be described in detail, by way of example, with reference to the accompanying diagrammatic drawings in which.

Figure 1:
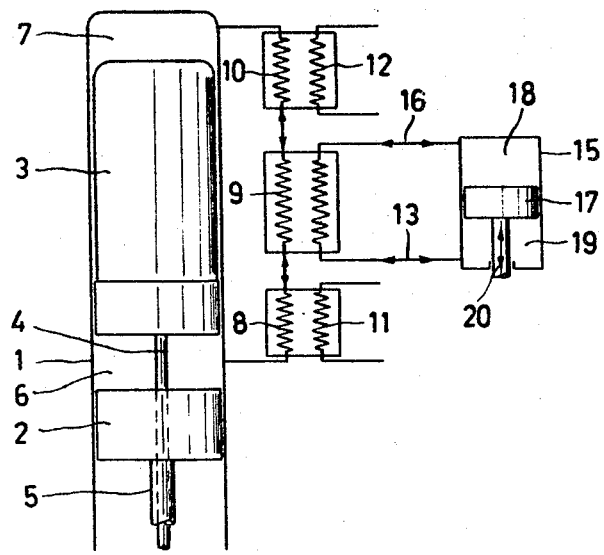
FIGURE 1 shows, not to scale, a one-cylinder hot-gas piston engine which includes a recuperator instead of a regenerator between the compression and expansion spaces, in which recuperator the working medium exchanges heat with another medium which serves to absorb and give off heat.

Referring now to FIGURE 1, the reference numeral 1 indicates a cylinder in which a piston 2 and a displacer 3 can move with phase displacement. The piston 2 and the displacer 3 are connected through a piston rod 4 and a displacer rod 5, respectively, to a driving mechanism (not shown). During movement, the upper end of the piston 2 and the lower end of the displacer 3 vary the volume of a compression space 6 whereas the upper surface of the displacer varies the volume of an expansion space 7. The compression space 6 and the expansion space 7 communicate with one another through a cooler 8, a recuperator 9 and a freezer 10. The compression space 6 and the expansion space 7 contain a working medium which, due to the movements of piston 2 and displacer 3, flows alternately from the compression space to the expansion space and backwards through the said communication. In the cooler 8 the working medium gives off heat to the cooling water flowing through ducts 11. In the freezer 10 the working medium absorbs heat from a medium to be cooled which flows through ducts 12.

The recuperator 9 has two sets of ducts. The working medium flows back and forth through the first set of ducts. The second set of ducts communicates at one of their ends through a duct 13 with one end of a cylinder 15 and at their other ends through a duct 16 with the other end of cylinder 15. A piston-shaped body 17 can move in the cylinder 15 so that the medium is displaced from a space 18 to a space 19 when the working medium of the hot-gas piston engine flows from the compression space 6 to the expansion space 7, and the medium is transported in the reverse direction when the working medium flows from the expansion space back to the compression space. The ducts 13 and 16 and the cylinder 15 are surrounded by thermal insulation (not shown).

The engine operates as follows: The medium compressed in the compression space 6 is displaced to the expansion space 7. On its way thereto the working medium first gives off its compression heat to the cooling water in the cooler 8. Subsequently, the working medium flows in counterflow with another medium through the recuperator 9 giving off a certain amount of heat to the medium which is transported from the space 18 to the space 19 by the piston 17. Next the working medium enters the expansion space in which it falls in temperature due to the expansion. In the freezer 10 the medium absorbs heat from a medium to be cooled so that the working medium on its way back to the compression space enters the recuperator 9 again at the temperature of the freezer. At the same time with the reversal of the direction of flow of the working medium the direction of flow of the medium in the cylinder 15 and the ducts 13 and 16 has also reversed. The working medium now absorbs again the heat stored in the medium during the previous period and is heated up again in the heat-exchanger from the temperature of the freezer to the temperature of the cooler. The medium in the cylinder 15 and in the ducts 13 and 16 thus serves to absorb and give off heat. The medium used may advantageously be a gas, especially at comparatively low temperatures. Gases afford the advantage of a good specific heat even at very low temperatures. With comparatively simple means a heat regenerator is thus obtained which is formed as a recuperator and which affords advantages over known regenerators, especially at comparatively low temperatures. By suitable choice of the diameter of a piston rod 20 it is possible to avoid pressure variations in the cylinder 15 and the ducts 13 and 16.

Figure 2:
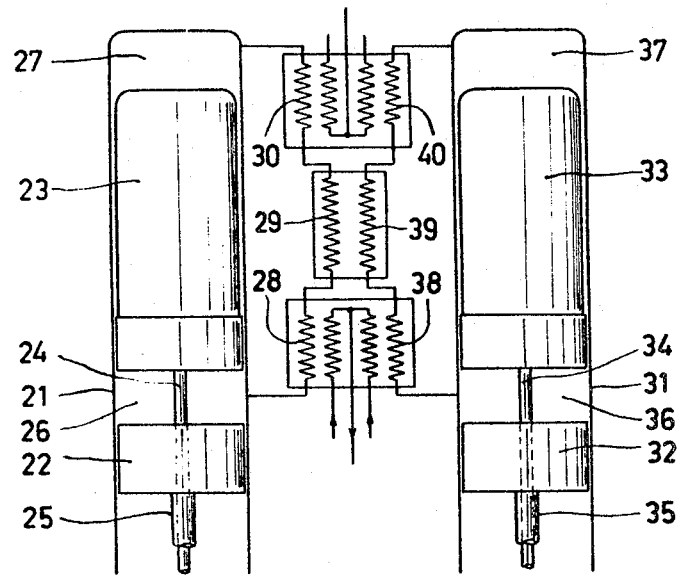
FIGURES 2 and 3 show, not to scale, a two-cylinder and a three-cylinder hot-gas piston engine, respectively, which includes a recuperator in which the working medium of one cylinder is in heat-exchange with the working medium of the other cylinder of the two other cylinders.

FIGURE 2 shows a two-cylinder hot-gas piston engine. This engine comprises two cylinders 21 and 31 in which pistons 22 and 32 respectively and displacers 23 and 33 respectively are adapted to move. During movement of these elements the volumes of compression spaces 26 and 36 respectively and of expansion spaces 27 and 37 respectively are varied. The compression space 26 and the expansion space 27 communicate with one another through a cooler 28, heat-exchanging ducts 29 and a freezer 30. The compression space 36 and the expansion space 37 communicate with one another through a cooler 38, heat-exchanging ducts 39 and a freezer 40.

In the coolers 28 and 38, which may be combined if desired, the working medium of cylinder 21 and the working medium of cylinder 31 exchange heat with the cooling water.

The pistons 22 and 32 are coupled through piston rods 25 and 35, respectively, to a driving mechanism, not shown, which moves the said pistons with a phase difference of 180°.

The displacers 23 and 33 are likewise coupled through displacer rods 24 and 34, respectively, to the driving mechanism not shown, which moves the said displacers with a phase difference relative to the pistons, the phase difference between the displacers being likewise 180°.

Due to the 180° phase difference between the pistons 22 and 32 and the displacers 23 and 33 respectively, when the working medium flows from compression space 26 to expansion space 27, the working medium of the other cylinder will flow from expansion space 37 to compression space 36 and conversely. This implies that the working medium in the ducts 29 invariably flows in opposition to the working medium in the ducts 39.

The working meduim of cylinder 21 enters the ducts 29 at a temperature substantially equal to the temperature of the cooling water and leaves the said ducts at a temperature substantially equal to the temperature of the freezer. The amount of heat thus lost by the working medium just suffices to heat up the working medium of cylinder 31 from the temperature of the freezer to the temperature of the cooler.

The working medium of cylinder 31 thus absorbs the amount of heat which must be dissipated from the working medium of cylinder 21 during one half of the cycle. During the other half of the cycle the working medium of cylinder 21 flows back to the compression space 26 and absorbs in the ducts 29 the same amount of heat from the working medium of cylinder 31 which flows from compression space 36 to expansion space 37 during this period.

A medium can be cooled in the freezers 30 and 40. These freezers may be combined, if desired.

Instead of the regenerator in known engines in which the filling mass alternately absorbs and gives off heat, use is now made of a recuperator in which the working media of the two cylinders alternately absorb and give off heat.

Figure 3:
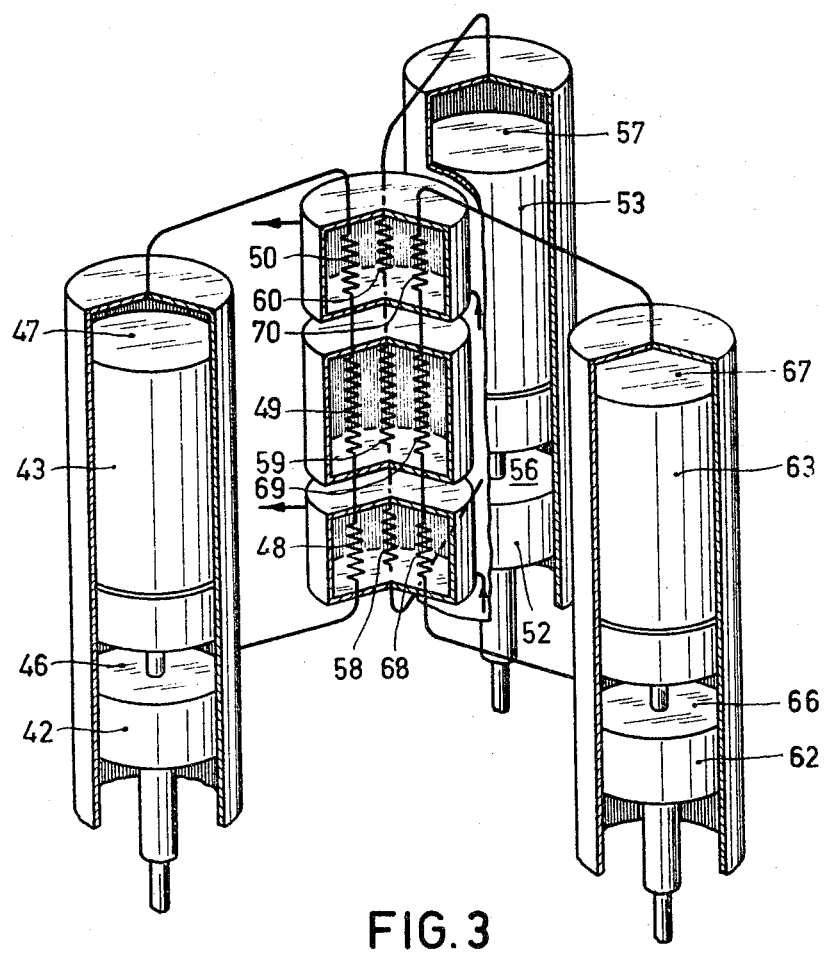

While the hot-gas piston engine of FIGURE 2 has two cylinders, FIGURE 3 shows at three-cylinder hot-gas piston engine. In this engine pistons 42, 52 and 62 and displacers 43, 53 and 63 show relative phase displacements of 120°. As before, compression spaces 46, 56 and 66 are connected to expansion spaces 47, 57 and 67 respectively. The connections include three heat-exchangers, that is to say, coolers 48, 58, 68, recuperators having ducts 49, 59 and 69 and freezers 50, 60 and 70.

In the recuperator the working medium of each cylinder exchanges heat with the working medium of the other two cylinders. Due to the phase difference of 120° between the corresponding piston bodies of the cylinders, it is ensured that substantially the same amount of medium flows through the recuperator in one direction and the other. The recuperator is thus balanced so that the final temperatures may have constant values (freezer temperature and cooler temperature) and, apart from losses due to the heat-exchange, no transport of heat through the recuperator will occur. The recuperator thus acts again as a regenerator, the working medium in each cylinder serving alternately to absorb heat and to give off heat.

Figure 4:
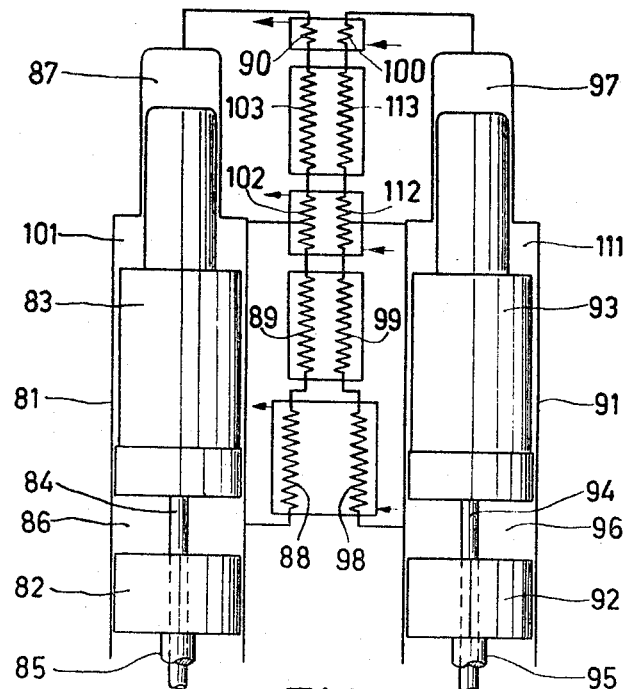
FIGURE 4 shows a two-cylinder hot-gas piston engine in which each cylinder comprises one compression space and two expansion spaces, a recuperator being provided between each pair of corresponding spaces of the cylinders.

FIGURE 4 shows a cold-gas refrigerator comprising two cylinders 81 and 91 containing pistons 82 and 92 respectively and displacers 83 and 93 respectively. The pistons and displacers are coupled through piston rods 85 and 95, respectively, and displacer rods 84 and 94, respectively, to a driving mechanism (not shown) which moves piston 82 and displacer 83 with a phase difference of 180° relative to piston 92 and displacer 93.

During movement, the pistons 82 and 92, together with the lower sides of the displacers 83 and 93 respectively, vary the volumes of compression spaces 86 and 96 respectively.

The displacers 83 and 93 are of a stepwise construction and, during their movements, vary the volumes of expansion spaces 87, 101 and 97, 111 respectively.

The compression spaces 86 and 96 and the expansion spaces 101, 87 and 111, 97 respectively communicate with one another through a plurality of heat-exchangers.

These communications include first of all, as reckoned from the compression spaces 86 and 96 respectively, coolers 88, 98 respectively, in which the working media exchange heat with a cooling medium.

Subsequently, the working medium passes through recuperators 89, 99 respectively, in which the working medium of one cylinder exchanges heat with the working medium of the other cylinder. The communications also include intermediate freezers 102, 112 respectively, in which the medium gives off the cold produced in intermediate expansion spaces 101 and 111 respectively, to a medium to be cooled. The portions of the communications located between the expansion spaces 101, 87 and 111, 97 respectively include second recuperators 103, 113 respectively, in which the medium of one cylinder exchanges heat with the medium of the other cylinder. The communications also include final freezers 90 and 100 respectively, in which the media give off the cold produced in the expansion spaces 87 and 97, respectively, to the medium to be cooled.

After the foregoing the operation of this arrangement needs no further explanation. The recuperators 89, 99 and 103, 113, respectively, again have taken over the function of the regenerators. Since cold-gas refrigerators having a stepwise displacer are especially suitable for obtaining very low temperatures, it will be evident that especially the recuperators 103, 113, which thus also operate at very low temperatures, afford advantages over known regenerators. The recuperators 89, 99 may be replaced by regenerators, if desired.

The invention has been discussed hereinbefore, by way of example, with reference to hot-gas piston engines of the displacer type.

Figure 5:
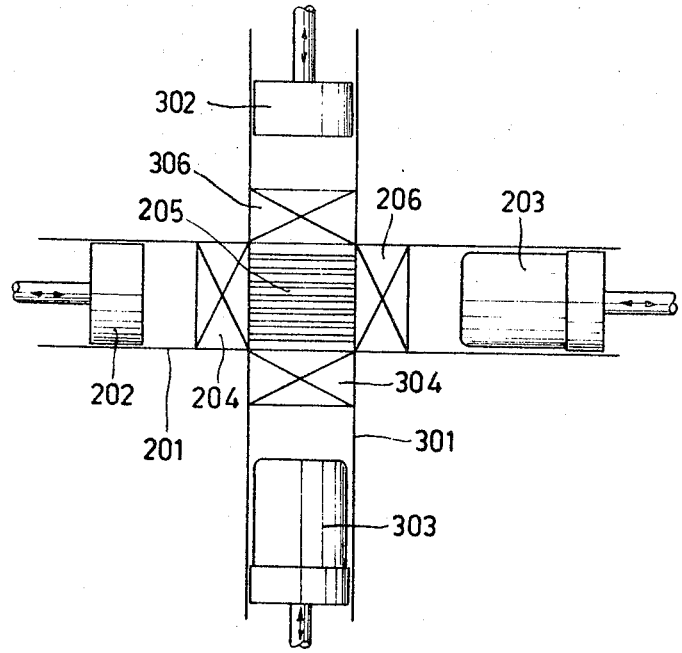
FIGURES 5 and 6 show two hot-gas piston engines of the two-piston type.
Figure 6:
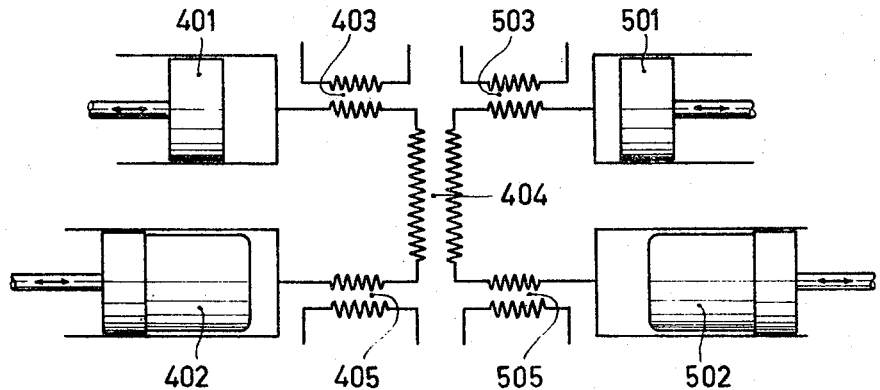

After the foregoing it will be evident that the engine is also applicable to a hot-gas piston engine of the two-piston type. FIGURES 5 and 6 show two embodiments of hot-gas piston engines of the two-piston type.

In FIGURE 5 two cylinders 201 and 301 are arranged at an angle of 0°. Compression pistons 202 and 302 respectively and expansion pistons 203 and 303 respectively are movable in the said cylinders. The phase difference between the pistons 202 and 302 and that between the expansion pistons 203 and 303 is again 180°. The cylinder 202 also contains a cooler 204, a pipe heat-exchanger 205 and a freezer 206. The other cylinder 301 contains a cooler 304, the same pipe heat-exchanger 205 and a freezer 306. In the pipe heat-exchanger the medium of cylinder 201 and that of cylinder 301 will again alternately give off heat to one another and absorb heat from one another.

Another arrangement of a two-piston hot-gas piston engine is shown in FIGURE 6. In this engine compression pistons 401 and 501 respectively and expansion pistons 402 and 502 respectively are arranged in juxtaposed cylinders. The cylinders communicate with one another through coolers 403 and 503 respectively, a heat-exchanger 404 and freezers 405 and 505 respectively. In the heat-exchanger 404 the media of the two cycles are again invariably in counterflow with one another so that a regenerator action is again obtained.

Figure 7:
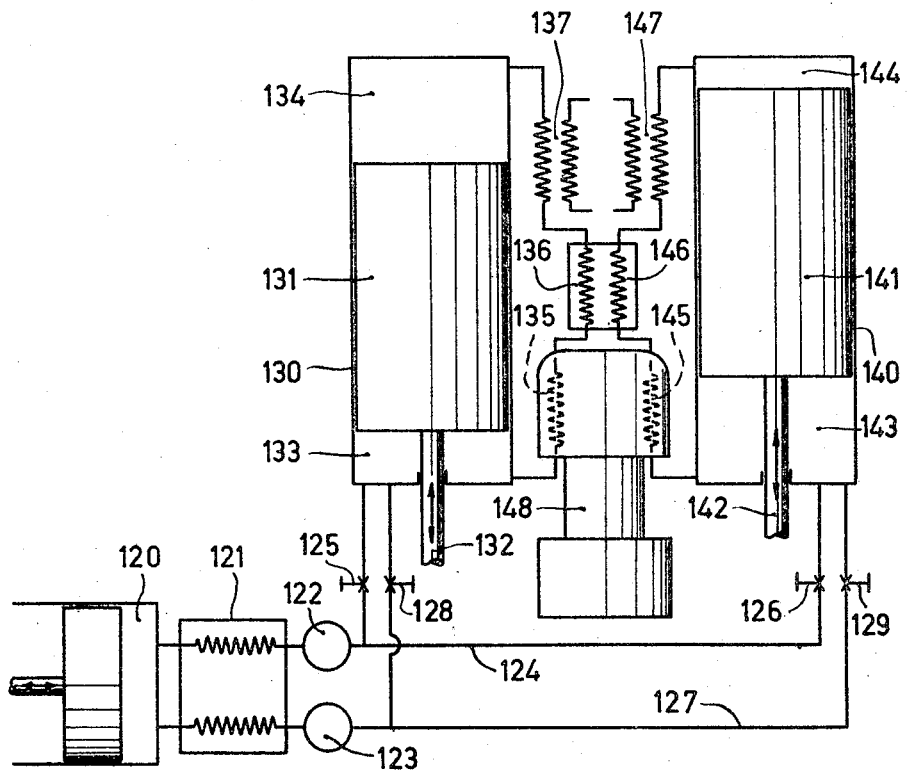
FIGURE 7 shows an arrangement for producing cold which comprises a compression device and two cylinders in which displacers can move to vary the volumes of a warmer space and a colder space.

FIGURE 7 shows an arrangement for producing cold. This arrangement comprises a compressor 120, a heat-exchanger 121, a high-pressure container 122 and a low-pressure container 123. The high-pressure container 122 is connected through a line 124 and adjustable taps 125 and 126 respectively to the warmer ends of cylinders 130 and 140 respectively. The low-pressure container 123 is also connected through a line 127 and adjustable taps 128 and 129 respectively to the warmer ends of the cylinders 130 and 140 respectively. These cylinders 130 and 140 contain displacers 131 and 141 respectively, which are coupled through displacer rods 132 and 142 respectively to a driving mechanism (not shown) which moves the displacers 131 and 141 with a relative phase difference of 180°. During movement, the displacers 131 and 141 vary the volumes of warmer spaces 133 and 143 respectively and the volumes of colder spaces 134 and 144 respectively.

The spaces 133, 134 and 143, 144 communicate with one another through coolers 135, 145, recuperators 136, 146 and freezers 137, 147 respectively.

In the coolers 135 and 145 the working media of the two cylinders exchange heat with a cold source. In the device shown, this cold source is formed by a cold-gas refrigerator 148. If desired, the working medium may be cooled in another way, for example, by bringing it in the cooler into heat-exchange with a cooling agent such as liquid air, liquid nitrogen, etc.

In the freezers 137, 147 the working medium gives off the cold produced in the expansion spaces 134, 144 to a medium to be cooled.

The arrangement operates as follows:

When the displacer 141 occupies substantially its upper position the tap 126 is opened, thus connecting the space inside cylinder 140 to the high-pressure container 122. The tap 126 remains open until the displacer 141 occupies substantially its lowest position. This means that a high-pressure medium is transported from space 143 through the cooler 145 in which the medium is cooled, and through the recuperators 146, 136 in which the medium gives off heat to the medium of cylinder 130, to the cold expansion space 144.

At the same time the displacer 131 moves from its lowest position upwards, while the tap 128 is slowly opened. The space inside cylinder 130 is thus connected to the low-pressure container 123, the working medium in cylinder 130 thus expanding while this medium is substantially in the expansion space 134. During this period the expanded cold medium flows from space 134 through freezer 137 in which it gives off the cold produced in space 134 to a medium to be cooled, through a recuperator 136 in which it absorbs heat in counterflow with the medium in the ducts 146 and through cooler 135 to the space 133.

At the end of this period the displacer 133 occupies its upper position and the displacer 141 occupies its lowest position. The taps 128 and 126 are then closed. Next the tap 129 is slowly opened and the tap 125 is also opened. Now the medium in cylinder 140, which is substantially in the expansion space 144, will expand while the displacer 141 moves upwards. The working medium in this cylinder is then transported from space 144 to space 143 through freezer 147, the recuperator ducts 146 and cooler 145. At the same time, the displacer 131 will move downwards so that the medium in cylinder 130 is transported from space 133 through cooler 135, the recuperator ducts 136 and freezer 137 to space 134. In the recuperators 136 and 146 the flows of media are thus again in opposition, the medium which flows to expansion space 134 giving off its heat to the medium which flows to the warmer space 144. Especially, in this arrangement in which heat must be alternately stored and absorbed at very low temperatures, it is in practice very difficult to work with a regenerator since known filling masses have an unduly low specific heat at the said temperatures. In the recuperators 135 and 146 the medium of one cycle serves to absorb heat from the other cycle. Satisfactory operation of the arrangement is obtained due to the fact that gases still have a good specific heat at the said low temperatures.

In the arrangements above described, it is important that the relevant recuperators in which the medium of one cycle exchanges heat with the medium of another cycle are balanced, that is to say the thermal capacity flow rate of the medium flowing through the recuperator in one direction must be substantially equal to the thermal capacity flow rate of the medium flowing through the recuperator in the other direction.

Under certain conditions, it is possible that these thermal capacity flow rates differ slightly, for example, due to the phase between the movements of the flows of media differing slightly from the phase required theoretically. This would mean that a certain heat transport through the recuperator would occur. To avoid this imperfectness, it is possible to place the ducts through which the medium flows at a small distance from one another and fill the space between the ducts with a material having a high specific heat. It is also possible to manufacture the walls of the ducts from a material having a high specific heat, an intermediate form between a recuperator and a regenerator thus being obtained. The largest amount of heat is then transferred from one working medium to the other, whilst the unbalance amount is stored in the filling material. Temporary unbalance is thus also obviated completely. If the recuperator operates at very low temperatures the material provided between the flow-channels will still have a reasonable specific heat relative to other solids at the said temperatures. A suitable material is lead, mercury, cadmium, or alloys of these substances.

According to the invention it has now become possible to use a recuperator instead of a regenerator in a caloric system in which a medium is alternately compressed and expanded.

What is claimed is:

1. An apparatus for converting mechanical energy into caloric energy or vice versa comprising at least one space having a variable volume at a comparatively high mean temperature during operation of said apparatus, at least another space having a variable volume at a comparatively low mean temperature during operation of said apparatus being connected to said one space, the connection between the said spaces including at least one heat exchanger through which a working medium can flow in both directions on its way from one space to the other to give off heat during flow in one direction and to absorb heat during flow in the other direction, said heat exchanger being a recuperator and comprising at least two sets of ducts, one set of ducts having the working medium flowing therethrough, the other set of ducts for another medium which is adapted to traverse said other set of ducts alternately in opposite directions, and means for reversing the direction of flow of the other medium at least substantially at the same time with the reversal of the direction of the flow of said working medium.

2. An apparatus for converting mechanical energy into caloric energy or vice versa comprising at least one space having a variable volume at a comparatively high mean temperature during operation of said apparatus, at least another space having a variable volume at a comparatively low mean temperature during operation of said apparatus being connected to said one space, the connection between the said spaces including at least one heat exchanger through which a working medium can flow in both directions on its way from one space to the other to give off heat during flow in one direction and to absorb heat during flow in the other direction, said heat exchanger being a recuperator and comprising at least two sets of ducts, one set of ducts having the working medium flowing therethrough, the other set of ducts for another medium which is adapted to traverse said other set of ducts alternately in opposite directions, a cylinder and a piston reciprocating therein, said other set of ducts communicating at one end with one end of said cylinder and the other end with the other end of said cylinder, said piston operating in said cylinder in such a manner that the other medium therein reverses its direction substantially simultaneously with the flow of the working medium in the first set of ducts.

3. A hot gas reciprocating apparatus comprising at least two separate cylinders, a piston and a displacer in each cylinder defining a compression space and an expansion space, a piston reciprocating in each of said cylinders for varying the volume of the compression space and expansion space in each of said cylinders, said compression spaces and expansion spaces having relatively different mean temperatures, a recuperator provided between a pair of spaces in one cylinder and a pair of spaces in the other cylinder, a first set of ducts connecting the spaces of one cylinder and a second set of ducts connecting the spaces of the other cylinder, said pistons in the cylinders operating with a phase difference of about 180°.

4. An apparatus for converting mechanical energy into caloric energy and vice versa as claimed in claim 1 wherein said apparatus constitutes a hot gas reciprocating apparatus having three separate cylinders, a piston adapted to reciprocate in each of the cylinders, at least one compression space and at least one expansion space in each of said cylinders, a recuperator having three sets of separate ducts for connection between the compression and expansion spaces in each of said cylinders, and the movement of one of the pistons in one cylinder having a phase difference of approximately 120° relative to the movements of the corresponding pistons in the other cylinders.

5. A hot gas reciprocating apparatus as claimed in claim 3 wherein each cylinder of said apparatus is provided with one compression space and at least two expansion spaces, and said recuperator in the communication between said two expansion spaces.

6. An apparatus for converting mechanical energy into caloric energy and vice versa as claimed in claim 1 including a pair of cylinders, a displacer piston reciprocating in each cylinder, each of said pistons and cylinders defining a space of relatively high mean temperature and a space of relatively low mean temperature wherein the volume of said space of relatively high mean temperature and the volume of said space of relatively low mean temperatures are varied in phase opposition, a plurality of inlet and outlet control valves for each of said spaces having a comparatively high mean temperature, and a control device for controlling said control valves for each cylinder so that the inlet valve is opened when the space of relatively high mean temperature has substantially its maximum value and is closed after said piston has begun to move toward the space of relatively high mean temperature, whereafter said control device opens the outlet valve when the space of relatively low mean temperature has substantially its maximum volume and maintains the outlet valve open until the said space has substantially its minimum volume and a recuperator between the space of higher mean temperature and the space of lower mean temperature having two sets of ducts, the first set connecting the spaces in one cylinder and the second set connecting the spaces in the other cylinder.

7. An apparatus for converting mechanical energy into caloric energy or vice versa as claimed in claim 6 further comprising a cooler in heat exchanging relationship with said working medium located in the ducts between the recuperator and the space of higher mean temperature.

8. An apparatus for converting mechanical energy into caloric energy or vice versa as claimed in claim 7 wherein said cooler constitutes a cold gas refrigerator.

9. An apparatus for converting mechanical energy into caloric energy or vice versa as claimed in claim 1 wherein said recuperator is provided with a relatively small space filled with a material having a high specific heat between said ducts having the working medium flowing therethrough.

10. An apparatus for converting mechanical energy into caloric energy or vice versa as claimed in claim 9 wherein said material having a high specific heat is chosen from the group consisting of mercury, lead, cadmium and alloys thereof.

References Cited by the Examiner

UNITED STATES PATENTS

| | | | |
|---|---|---|---|
| 1,321,343 | 11/1919 | Vuilleumier | 62—88 |
| 3,115,014 | 12/1963 | Hogan | 62—6 |
| 3,166,911 | 1/1965 | Meijer | 62—6 |
| 3,221,509 | 12/1965 | Garwin | 62—6 |

WILLIAM J. WYE, *Primary Examiner.*